(12) United States Patent
Sytema

(10) Patent No.: US 6,216,849 B1
(45) Date of Patent: *Apr. 17, 2001

(54) BELT ASSEMBLY

(75) Inventor: Herman Sytema, Terhorne (NL)

(73) Assignee: Hadewe B.V., Drachten (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/236,460

(22) Filed: Jan. 25, 1999

Related U.S. Application Data (63) Continuation of application No. 08/064,440, filed on May 21, 1993, now Pat. No. 5,979,639.

(30) Foreign Application Priority Data

May 22, 1992 (NL) ................................ 9200915

(51) Int. Cl.$^7$ .................................... B65G 19/24
(52) U.S. Cl. ................... 198/731; 198/844.2; 24/31 F
(58) Field of Search ............................. 198/690.2, 698, 198/699, 730, 731, 733, 748, 844.2; 24/31 F, 32, 35, 36, 38; 474/255, 257

(56) References Cited

U.S. PATENT DOCUMENTS

| | | | |
|---|---|---|---|
| 2,687,209 | * 8/1954 | Rost et al. | 198/690.2 |
| 3,015,381 | * 1/1962 | Mohwinkel et al. | 198/844.2 |
| 3,274,707 | * 9/1966 | Garden | 24/31 F |
| 3,590,737 | * 7/1971 | Stroud | 198/844.2 |
| 4,348,947 | 9/1982 | Lerner . | |
| 4,757,576 | * 7/1988 | Jaubert | 198/844.2 |
| 4,884,393 | * 12/1989 | Hilleby | 198/834 |
| 5,979,639 | * 11/1999 | Sytema | 198/731 |

FOREIGN PATENT DOCUMENTS

| | | | |
|---|---|---|---|
| 114 719 | 3/1899 | (DE) . | |
| 803 689 | 4/1951 | (DE) . | |
| 0 367 118 | 5/1990 | (EP) . | |
| 373 712 | 5/1907 | (FR) . | |
| 2 370 652 | 6/1978 | (FR) . | |
| 1668225 | * 8/1991 | (SU) | 198/844.2 |

OTHER PUBLICATIONS

Abstract of Japanese patent application publication No. 58–5554.

Three–page International Search Report dated Jan. 26, 1993.

* cited by examiner

*Primary Examiner*—Joseph E. Valenza
(74) *Attorney, Agent, or Firm*—Burns, Doane, Swecker & Mathis, L.L.P.

(57) ABSTRACT

A belt assembly which, in operation, can be tensioned along a path, comprising a belt having a toothed surface and a back surface and one unit or a plurality of units fastened to the belt on the side of the back surface. In the area of the or each unit, parts of the belt are bent out of the path of the belt assembly in the direction of the unit. The unit comprises a retention element which is in engagement with the toothed surface of the bent belt parts.

Further disclosed are units for use in the belt assembly according to the invention.

26 Claims, 8 Drawing Sheets

BELT ASSEMBLY

This application is a continuation of application Ser. No. 08/064,440, filed May 21, 1993, now U.S. Pat. No. 5,979,639.

BACKGROUND OF THE INVENTION

This invention relates to a belt assembly which, in operation, can be tensioned along a path, comprising a belt having a toothed surface and an oppositely located back surface, and one unit or a plurality of units fastened to the belt on the side of the back surface.

Such a belt assembly is utilized in practice, for instance in apparatuses for preparing items to be mailed, for the purpose of conveying postal items located on a transport surface. The unit fastened to the belt is often a carrier. The carriers extend through the slots provided in the transport surface and move forward the postal items to be conveyed as required, for instance stepwise.

The advantages of a belt assembly over the conveyor chains utilized heretofore, such as link chains of the bicycle-chain type, are important.

Firstly, belts make less noise and are lighter than chains. Owing to the smaller mass of the belts, the acceleration and retardation forces are smaller, so that the drives and slip-action clutches can be of lighter construction.

Secondly, unlike chains, belts need not be lubricated. Lubricated chains entail the risk of the postal items becoming dirty.

However, the belts used heretofore in apparatuses for preparing items to be mailed also have a number of disadvantages which are not inherent to conveyor chains and form an obstacle to the progressive introduction of the belt.

The most important disadvantage is the fact that the belts must be manufactured as endless belts with the carriers provided at predetermined positions. The carriers are connected to the back surface of the belt, for instance by means of glue or by ultrasonic welding, and the end parts of the belt are similarly connected to each other. This means that both the length of the endless belt and the position of the carriers are fixed and that for each type of apparatus for preparing items to be mailed, specific belts must be manufactured and kept in stock for service.

SUMMARY OF THE INVENTION

The object of the present invention is to provide a belt assembly without the disadvantages described hereinabove.

To that end, the belt assembly of the type mentioned in the preamble is characterized in that, in the area of at least one of the units mentioned, parts of the belt are bent out of the path of the belt assembly in the direction of the unit, the unit mentioned comprising at least one retention element which is in engagement with the toothed surface of the bent belt parts.

As with conveyor chains, units which are attached to the belt in this manner can be displaced or removed as required. Further, use can be made of standard commercially available belts without projections formed thereon by welding, which are considerably cheaper than the belts provided with projections, to be manufactured in accordance with stated specifications. Thus, according to the proposal of the present invention, a belt assembly is provided which combines the advantages of normal conveyor chains with the advantages of the conventional conveyor belts, with increased flexibility regarding the possible positions of the units on the belt and with a substantial reduction of the cost price. In addition, a loose unit provides the advantage of greater freedom in construction and the different designs thereof. A further advantage is that the position of the unit can be chosen accurately because it is related to the teeth of the belt. Further, such a unit can be arranged without special costly tools and, because the retention element engages the toothed surface, a firm connection between the belt and the unit can be obtained without the belt having to be clamped together at the point of the connection.

In particular when the belt assembly is utilized for positioning operations, it is particularly favorable when, in accordance with a further elaboration of the invention, the position of the or each retention element as well as the contour of parts of the unit against which the back surfaces of the bent belt parts abut are so designed that the teeth of portions of the toothed belt adjacent to the unit on either side thereof define a toothed profile extending over both belt portions, the pitch between teeth of one belt portion and the other belt portion being a whole multiple of the pitch of successive teeth of each belt portion.

Such a belt assembly can be passed over a toothed pulley without any difficulty, while maintaining the positioning accuracy.

If it is desired that the portion of the toothed belt assembly at the point where the unit is located passes through greater angles over a toothed pulley and, in particular, if that pulley moreover has a relatively small diameter, it is advantageous if the contour of parts of the unit against which the back surfaces of the bent belt parts abut are moreover so designed that the pitch between teeth of one belt portion and the other belt portion is also a whole multiple of the pitch of successive teeth of each belt portion when those belt portions follow a path bent in such a manner that the toothed side of the belt is located on the inside.

When bending the belt assembly from a straight path, such that the toothed side is located on the inside, the neutral plane of the belt assembly, at the point of the unit, forms a continuation of the neutral plane of the belt portions on either side of the unit, and it is located, in a direction perpendicular to that plane, at the same distance from the toothed side of the belt, or at least the continuations thereof, as the neutral plane of the belt portions on either side of the unit. This property can be obtained relatively simply with the belt assembly according to the invention because the belt portions may be bent out of the path at a very slight distance from each other and thereby the relative displacements of the belt portions adjacent to the unit upon bending of the belt assembly in the area of the unit can be simply adjusted to corresponding relative displacements upon a comparable bending of an uninterrupted belt portion, through a suitable design of the contours against which the bent belt portions abut.

As described above, the belt assemblies used heretofore have the disadvantage that, at least in apparatuses for preparing items to be mailed, they can only be used in endless form. Apart from the objection that endless belts must be kept in stock in a variety of matching lengths and must be especially manufactured to meet the stated specifications, the assembly and disassembly of endless belts is cumbersome and laborious. Further, in practice the repair of endless belts is impossible or possible only with special tools.

In order to circumvent the objections of an endless belt, it is particularly advantageous when the toothed belt is interrupted and when belt end parts on either side of the interruption form the bent belt parts.

The belt end parts can diverge relative to each other in the direction of their ends. This provides the advantage that the distance over which the belt end parts as well as the unit project from the back side of the adjacent belt portions can be limited inasmuch as the belt end parts do not project perpendicularly relative to the path determined by the belt portions. Thus, a unit of relatively flat design can be obtained.

A unit of particularly flat design can be obtained if the belt end parts are bent in substantially opposite directions.

When the unit is provided with channels for receiving the belt end parts, these channels comprising open flanks such that the bent belt end parts can be slipped into and out of the unit in both lateral directions, a very simple method of assembling the unit and the belt parts to be connected thereto is obtained. The connection between two belt end parts is effected in simple manner by slipping the belt end parts sideways into the channels.

Further, this provides the advantage that it is not necessary for parts of the unit to project in lateral direction beyond the toothed belt parts confined within the unit. Thus, a toothed belt assembly can be obtained which occupies little space in lateral direction. The fact that the unit does not project laterally also provides advantages with respect to the guidance of the belt assembly over a pulley, in particular when the width of the unit is equal to the width of the belt.

In particular in combination with the channels with open flanks, it is a further advantage of the above-described diverging course of the belt end parts in the unit, and especially of the oppositely directed course of the belt end parts in the unit, that the parts of the unit on which the supporting contours are provided extend from the mutual connection between them over a slight distance transversely to the path of the belt assembly. As a result, the bending moment exerted on those parts and the connection between them at a given belt tension is limited accordingly.

In further elaboration of the invention, the unit can comprise a carrier, for instance for moving forward items to be mailed, located on a transport surface.

In an alternative embodiment, the unit can comprise a magnetic detection element for determining the position of the unit and hence of the entire belt assembly.

According to a further elaboration of the invention, the unit comprises a block-shaped body having a passage of a substantially rectangular cross-section, which extends from an underside facing the belt, substantially perpendicularly to the underside, through the entire block-shaped body, first sides of the cross-section extending perpendicularly to the direction of the path of the belt and having a length substantially corresponding to the width of the belt, while second sides of the cross-section have a length such that two belt parts having their toothed surfaces disposed against each other or a doubled belt part can be received between the first sides. Further, the unit comprises means for fixing the belt parts having their toothed surfaces disposed against each other or a doubled belt part in the rectangular passage, using a fixing pin serving as a retention element, the fixing pin extending transversely to the direction of the path of the belt, parallel to a belt surface, between the belt parts having their toothed surfaces disposed against each other or between the legs of a loop formed by the doubled belt part.

Such a unit is suitable for attachment to an uninterrupted belt portion, but also for atttachment to two ends of belt portions for forming a continuous belt assembly.

According to an alternative further elaboration of the invention, the unit comprises two channels extending from an underside facing the belt, into which retention elements project and in which the bent belt parts are received so as to be form-closed in longitudinal direction. The retention elements may for instance project from a middle portion between the channels, but may also project from a connecting portion between parts that support the supporting contours.

With such a unit, no loose parts are necessary, nor any parts projecting laterally from the belt parts confined in the unit. This unit is suitable for detachably connecting two belt end parts.

At the location of the unit which comprises two channels extending from an underside facing the belt, substantially perpendicularly to this underside, in the direction of an upper side of the block-shaped body, and which interconnects two toothed belt end parts, one tooth is missing from the substantially continuous toothed profile.

Because, according to a further elaboration of the invention, a central post arranged between the channels is provided with an end projecting beyond the underside of the unit, which end is designed as a tooth of the same shape as the teeth of the belt, a continuous toothed profile is also obtained at the point of the connection between the two belt portions.

The invention may be further embodied in a unit for use in a belt assembly according to the invention, this unit comprising substantially oppositely located supporting contours for the parts of a toothed belt that are bent out of the path of the belt and at least one retention element located opposite at least one of those supporting contours, this retention element being designed for engagement of a toothed surface of the bent parts mentioned.

DETAILED DESCRIPTION OF SOME PREFERRED EMBODIMENTS OF THE INVENTION

Figure 1:
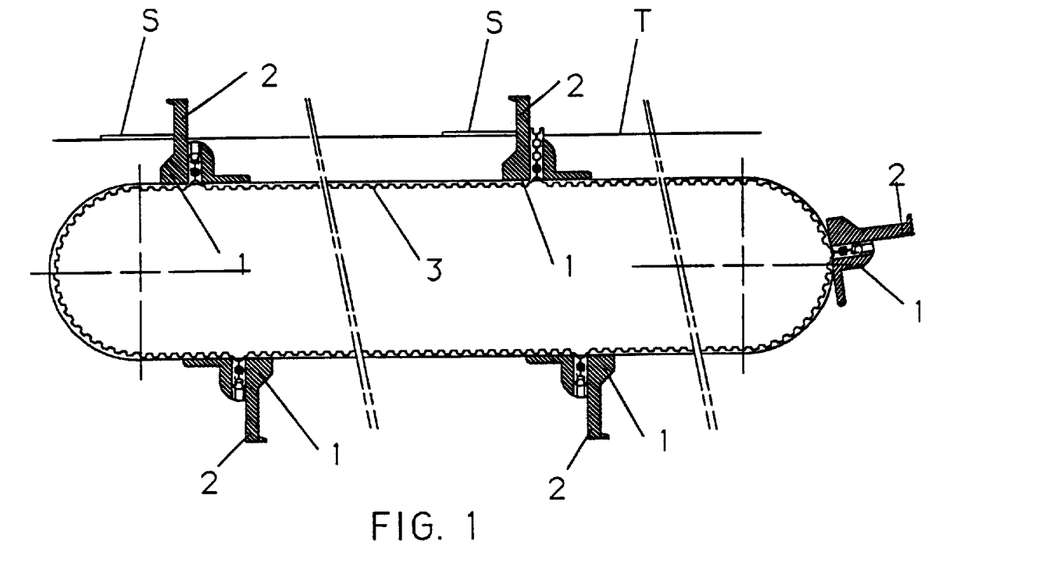
FIG. 1 shows an exemplary embodiment of a belt assembly according to the invention.

The exemplary embodiment of the belt assembly shown in FIG. 1 comprises a finite belt 3 with a plurality of units 1 provided with carriers 2, these units being connected to the belt 3. The unit 1 shown at the right-hand side at the same time connects the two end parts of the finite belt 3.

Figure 2:
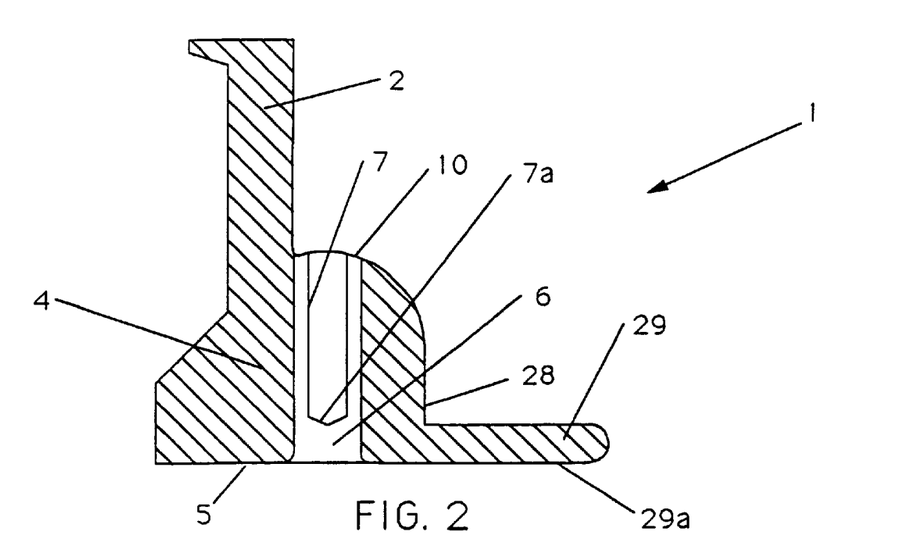
FIG. 2 is a longitudinal sectional elevation, taken on line II—II of FIG. 3, of an embodiment of the unit.
Figure 3:
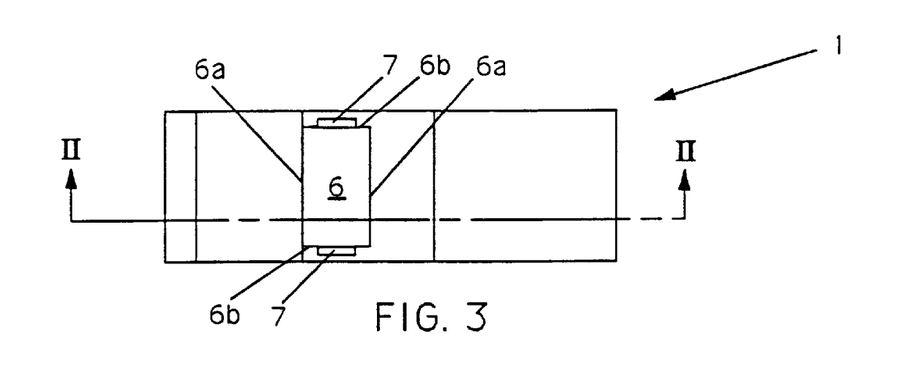
FIG. 3 is a top plan view of the unit shown in FIG. 2.
Figure 4:
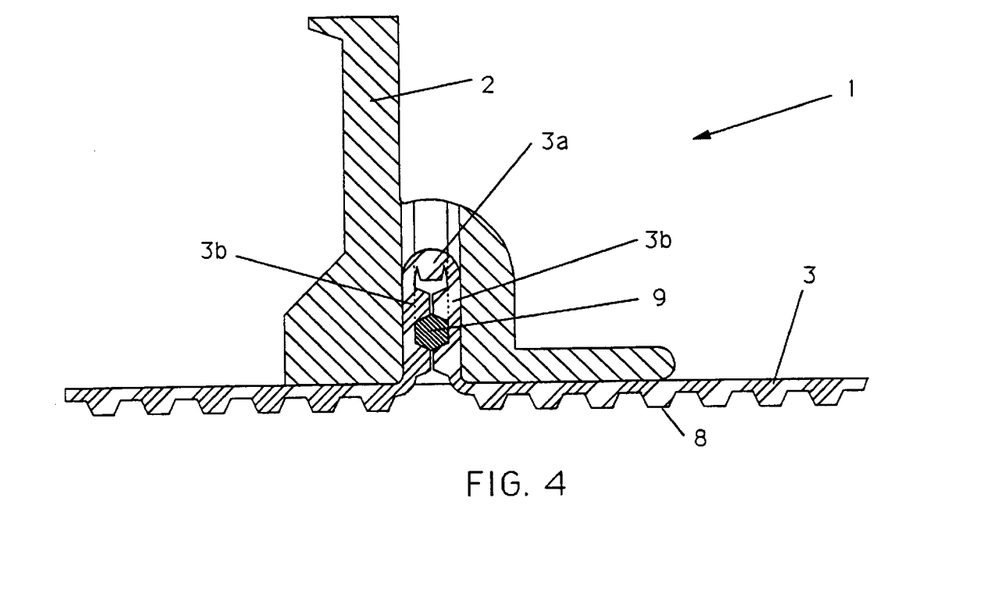
FIG. 4 is a sectional elevation similar to FIG. 2, where an uninterrupted toothed belt is connected to the unit.

It will be clear that the belt 3 can also consist of several finite belts parts and that these are interconnected by several units of the type shown in one of FIGS. 2–13. It will also be clear that the belt 3 can be an endless belt and that only units 1 of the type shown in FIGS. 2–4 are mounted on the belt.

It is noted that the present invention also covers a finite belt with units mounted thereon.

The units 1, 11 can be provided with carriers 2, 12, for conveying articles such as for instance items to be mailed on a transport track T, as well as with magnetic detection elements (not shown), for determining the position of the unit 1 or 11 in question or the belt assembly.

Figure 5:
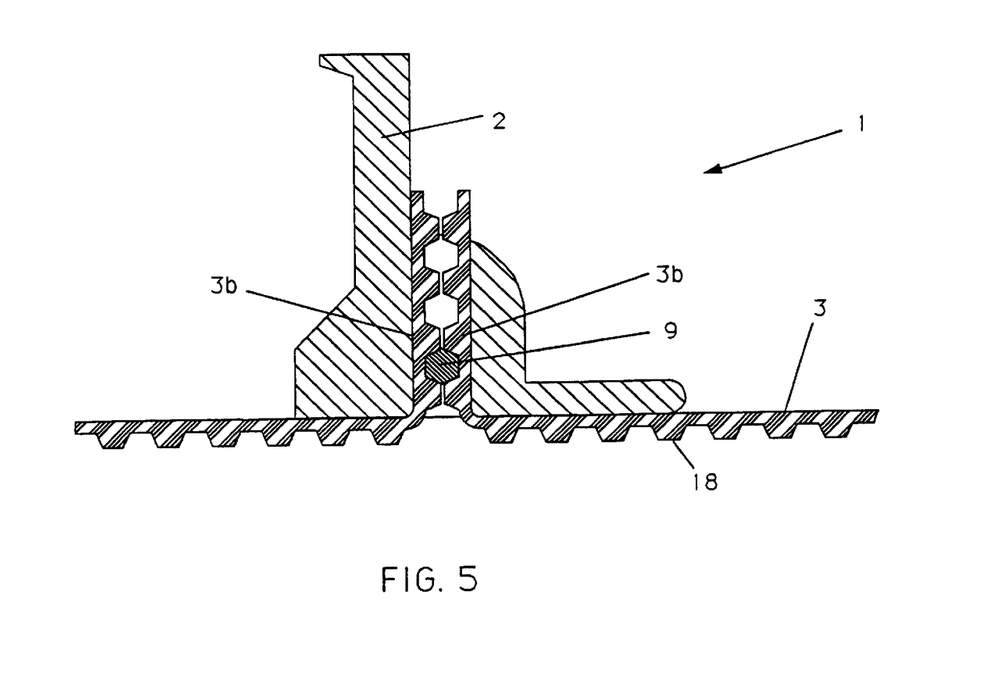
FIG. 5 is a sectional elevation similar to FIG. 2, where an interrupted toothed belt is connected to the unit.

The exemplary embodiment of unit 1 shown in FIGS. 2–5 is intended both for attachment to a continuous belt part 3 (see FIGS. 2–4) and to an interrupted belt part (FIG. 5). The unit 1 comprises a block-shaped body 4 having a passage 6 of a substantially rectangular cross-section, which extends from an underside 5 facing the belt 3, substantially perpendicularly to the underside 5, through the entire block-shaped body 4. The first sides 6a of the cross-section of the passage 6 extend perpendicularly to the direction of the path of the belt 3 and have a length substantially corresponding to the width of the belt 3. The second sides 6b of the cross-section of the passage 6 have a length such that two belt parts 3a, 3b having their toothed surfaces disposed against each other or a doubled belt part 3ab can be received between the first sides 6a. Further, the unit 1 comprises means 7 for fixing the belt parts 3a, 3b having their toothed surfaces disposed against each other or a doubled belt part 3ab in the rectangular passage 6 using a fixing pin 9 serving as a retention element. The fixing pin 9 extends transversely to the main direction of the belt 3, parallel to the belt surface, between the belt parts having their toothed surfaces disposed against each other or between the legs 3b of a loop 3ab formed by the doubled belt part 3a.

The means 7 for fixing the belt parts having their toothed surfaces disposed against each other or the doubled belt part 3ab using the fixing pin 9 are formed, in the embodiment shown, by two slots 7 which are provided in the respective passage walls corresponding with the second sides 6b of the cross-section. The slots 7 extend from an upper side 10 of the block-shaped body 4, substantially parallel to the passage 6 and terminate substantially halfway the passage 6 where the slots 7 form a supporting surface 7a for the fixing pin 9.

The assembly of a unit 1 so designed is very simple. If the unit 1 is to be mounted on a continuous belt part, first the belt 3 is doubled at the point where the unit 1 is to be mounted. Then the loop 3ab formed by the doubled belt or, in the case of an interrupted belt, the two belt end parts 3a, 3b having their toothed surfaces positioned against each other, are slipped from the underside 5 of the unit through the passage 6 to such an extent that the fixing pin 9 can be fitted at the desired point between the legs 3b of the loop 3ab or between the belt end parts 3a, 3b situated against each other. Then the belt 3 and the loop 3ab formed thereby or the belt end parts 3a, 3b can be pulled down relative to the unit 1 until the fixing pin 9 abuts the supporting surfaces 7a of the slots 7.

It will be clear that the fixing pin 9 could be accommodated in a bore (not shown) extending transversely to the direction of the path of the belt and intersecting the passage 6. This, however, renders assembly of the unit 1 more difficult because in that case the opening formed by the legs 3b of the belt loop 3ab or by the belt end parts 3a, 3b located against each other, must be brought into a position exactly in front of this bore before the fixing pin 9 can be introduced.

FIGS. 6–9 show an alternative unit 11 which at the same time serves for the connection of two belt end parts 13a and 13b, respectively. Such an alternative unit 11 is particularly suitable for forming an endless belt assembly from a finite belt assembly.

The alternative unit 11 comprises a block-shaped body 14 having two channels 17 extending from an underside 15 facing the belt, substantially perpendicularly to this underside 15, in the direction of an upper side 16 of the block-shaped body 14. The channels 17 extend substantially transversely to the direction of the path of the belt 13 and are provided with a configuration such that these can receive the bent belt parts 13a, 13b so that the latter are form-closed.

Figure 6:
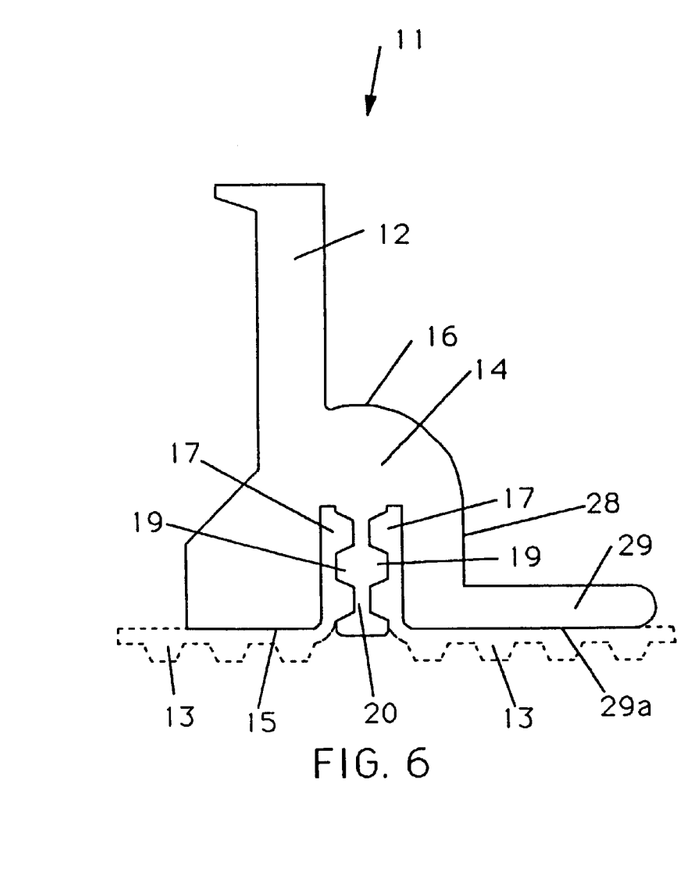
FIG. 6 is a top plan view of an alternative embodiment.
Figure 7:
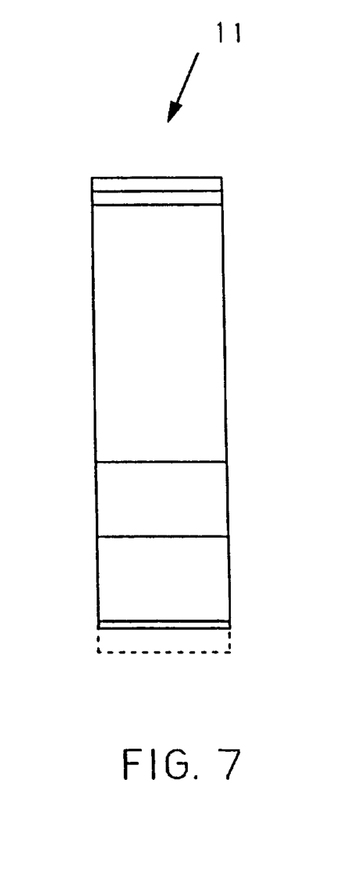
FIG. 7 is a side elevation of the left-hand side of the unit shown in FIG. 6.
Figure 8:
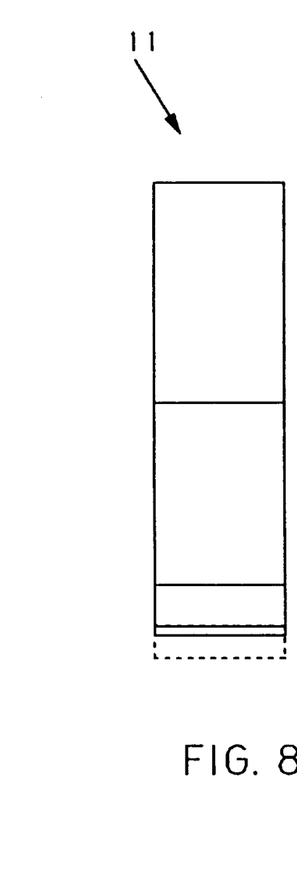
FIG. 8 is a side elevation of the right-hand side of the unit shown in FIG. 6.

As can be clearly seen in FIG. 6, at the point where the alternative unit 11 is located, a tooth is missing in the substantially continuous toothed profile which is determined by the two belt parts 13 extending on either side of the unit 11. In the embodiment of the alternative unit 11 shown in FIG. 9, a depending central post 20 is provided, located between the channels 17, this central post 20 being provided at the lower end thereof with a tooth 21 of the same shape as the shape of the teeth of the belt parts 13. This tooth 21 replaces the missing tooth in the substantially continuous toothed profile of the belt, formed by the belt portions 13. Thus a truly continuous toothed profile is also obtained at the point of the connection between the two belt portions 13.

The width of the block-shaped body 14 of the alternative unit 11 shown in FIGS. 6–13 substantially corresponds to the width of the belt 13 and the channels 17 extend over the entire width of the block-shaped body 14. When assembling such a unit 11, the belt end parts 13a and 13b can simply be slipped sideways into the channels 17.

Figure 9:
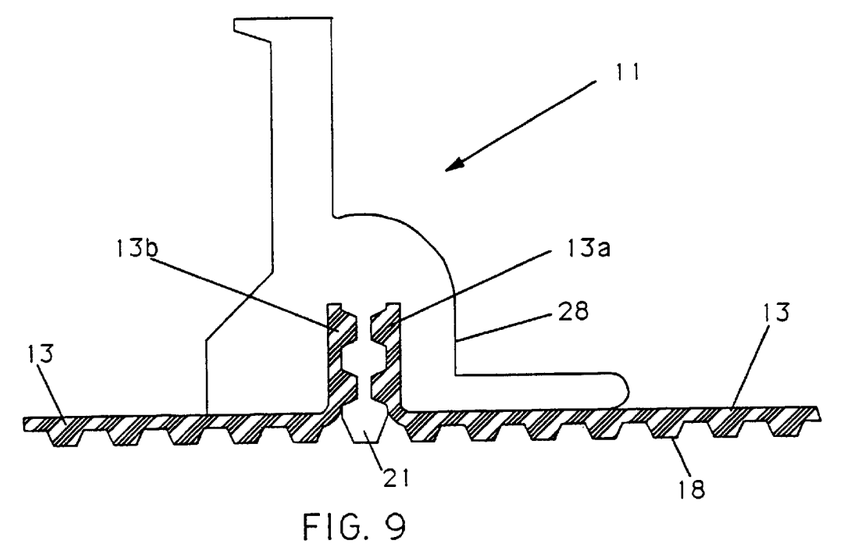
FIG. 9 is a second embodiment of an alternative unit with a toothed belt connected thereto.

The central post 20 comprises tooth-shaped retention elements 19 connected integrally therewith.

In the units 1 and 11, respectively, shown in FIGS. 1–9, the carrier 2 and 12, respectively, and the block-shaped body 4 and 14, respectively, are integrally constructed. Such a unit 1 or 11 can be manufactured simply and at low cost price.

In connection with calamities, for instance when an operator is caught between a carrier 2 or 12 and any other machine part (not shown), it may be particularly advantageous when the carrier 2 or 12 of the unit 1 or 11 is connected with block-shaped body 4 or 14 for pivotal motion about a line oriented perpendicularly to the direction of the path of the belt and parallel to the underside 5 or 15 of the unit 1 or 11, and is pretensioned into a vertical position by spring means 22, 23.

Figure 10:
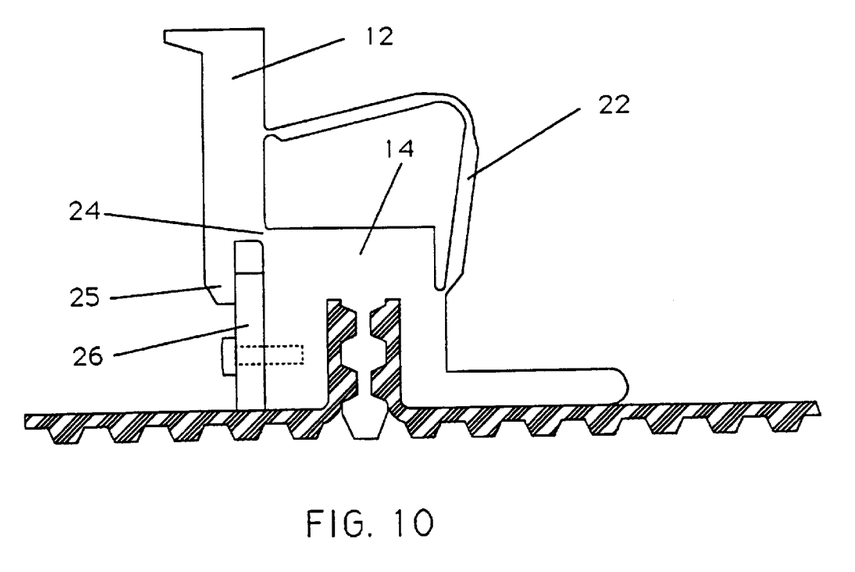
FIG. 10 shows a third embodiment of an alternative unit, wherein the finger is arranged in resilient manner.

In an embodiment of the unit as shown in FIG. 10, the carrier 12 is connected with the block-shaped body 14 via a thin-walled part 24. Further, the carrier 12 is provided at the lower end thereof with a stop 25. In the vertical position of the carrier 12, the stop 25 rests against a counterstop 26 which is connected with the block-shaped body 14. The block-shaped body 14 and the carrier 12 are in this case made of a fibre-reinforced plastics, for instance. After the manufacture of such a unit 11, the carrier is not oriented entirely vertically, but has its upper side directed in the main direction. By arranging the counterstop 26, the carrier 12 is brought into the vertical position. The spring means are formed by the flexible part 22 which urges the carrier 12 into the vertical position but which permits the carrier to pivot about the connection 24 when greater forces are exerted on the carrier.

Figure 11:
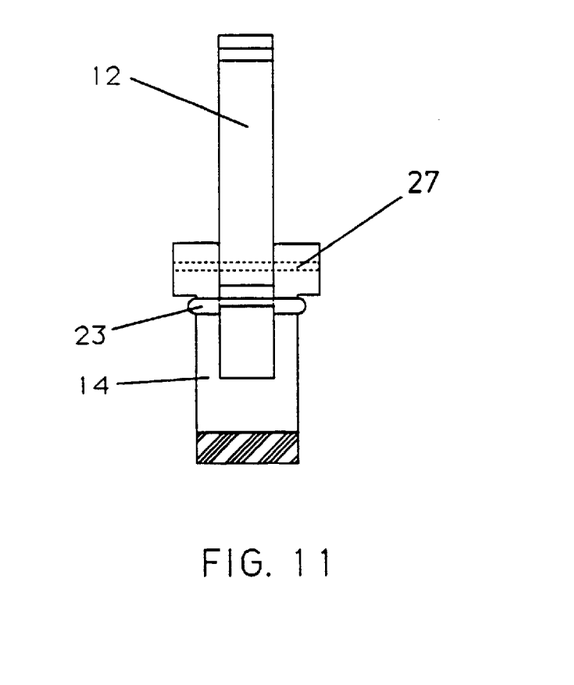
FIG. 11 shows a fourth embodiment of an alternative unit, wherein the finger is pivotally arranged and is pretensioned into the vertical position via a resilient O-ring.
Figure 12:
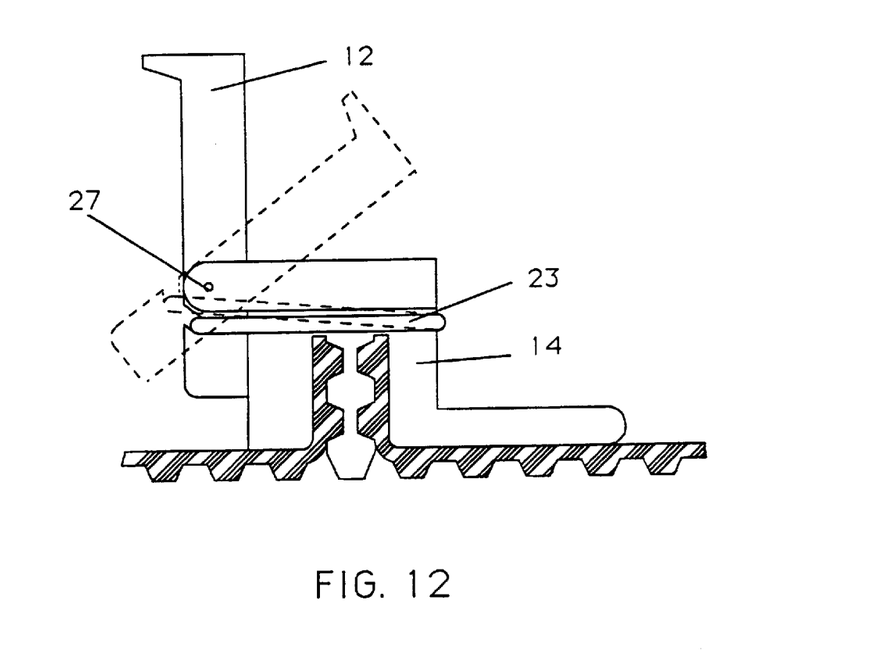
FIG. 12 shows an elevation of the left-hand side of the unit shown in FIG. 11.

FIGS. 11 and 12 show another exemplary embodiment of a unit wherein the carrier 12 is pivotally connected to the block-shaped body 14 via a pivot pin 27. In this case, the spring means are formed by an O-ring 23 engaging around the lower end of the carrier 12 and the block-shaped body 14.

It will be clear that the spring constructions shown in FIGS. 9–11 for the carrier 12 of the alternative units 11 can be used in a similar manner in the unit shown in FIGS. 1–5.

To prevent forces exerted on the carrier 2 or 12 from causing the unit 1 to tilt or giving rise to an undesired deformation of the belt 3 or 13 carrying this unit, all units 1 or 11 shown in FIGS. 1–11 are provided, at any rate at a rear side 28 of the block-shaped body 4 or 14, with a supporting member 29 comprising a supporting surface 29a which extends from the block-shaped body 14 in the direction of the path of the belt and aligns with the underside 5 or 15 of the block-shaped body 4 or 14.

Figure 13:
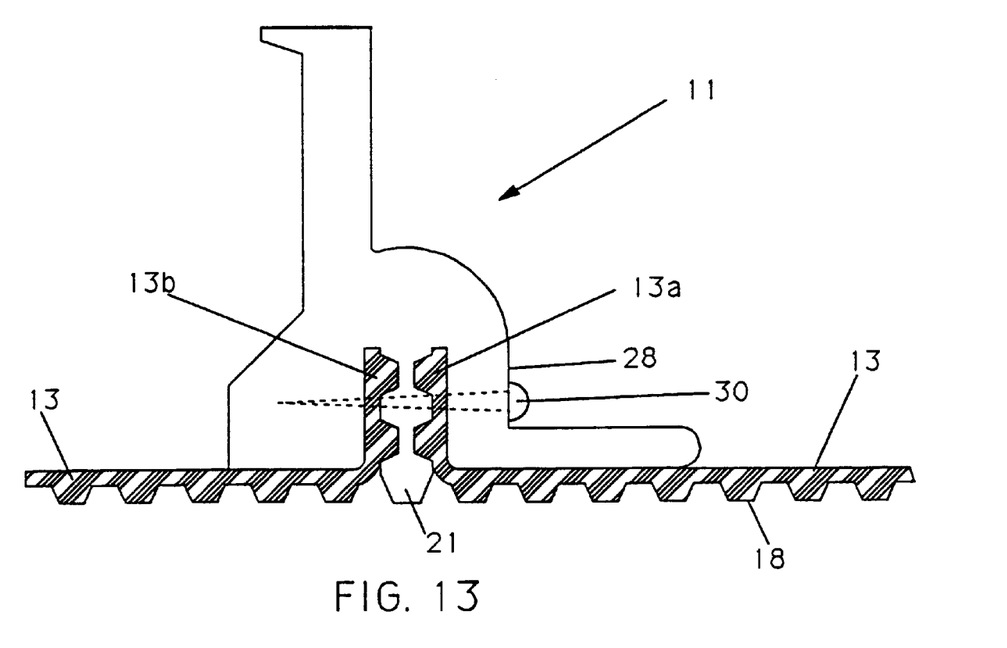
FIG. 13 shows a fifth embodiment of the unit.

When the tension on the belt assembly is very large, there is a risk of the channels 17 being bent apart, in particular with the alternative units 11 shown in FIGS. 6–12. This can be prevented when, in accordance with a further elaboration of the invention, a bolt, screw or similar connecting element 30 is arranged in the block-shaped body 14 and extends in the direction of the path of the belt 13 in such a manner that the two bent belt parts 13a, 13b are pierced and the channels 17 are squeezed together. Such a construction is shown in FIG. 13.

Figure 14:
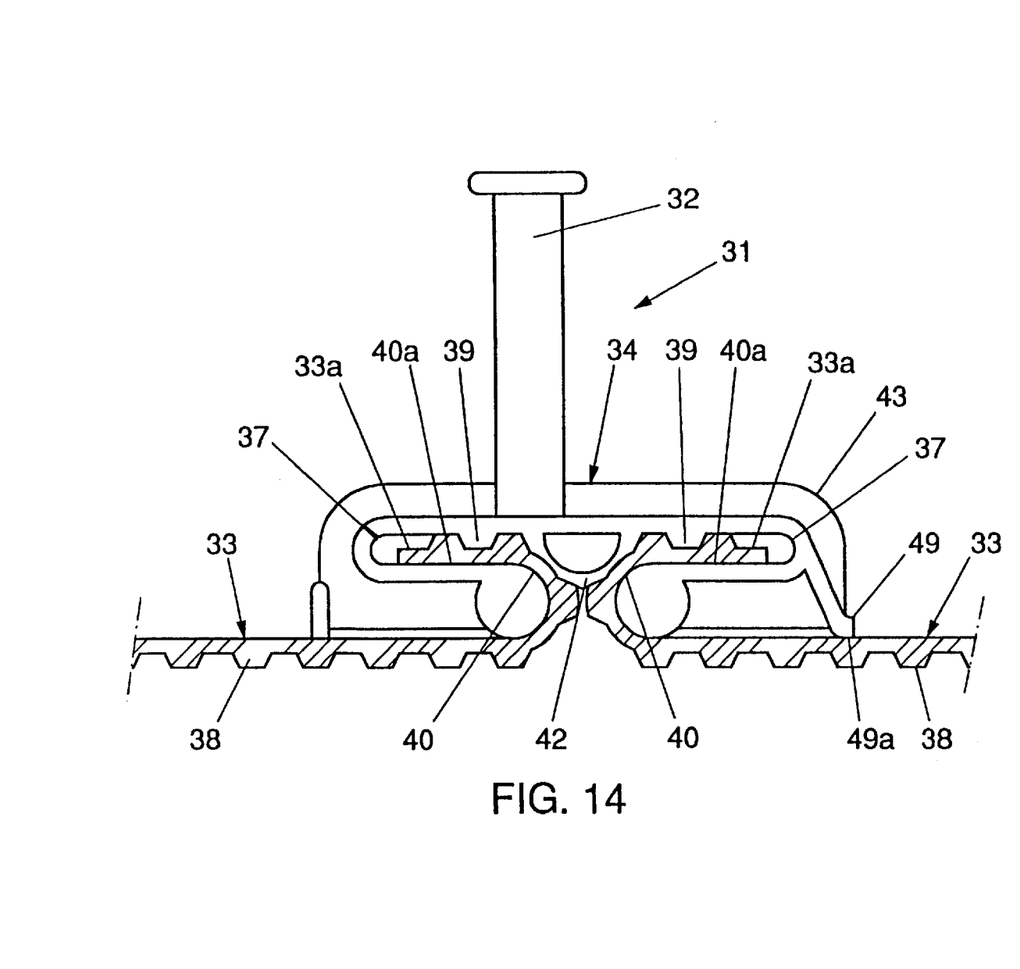
FIG. 14 is a side elevation of a sixth embodiment of the belt assembly according to the invention.
Figure 15:
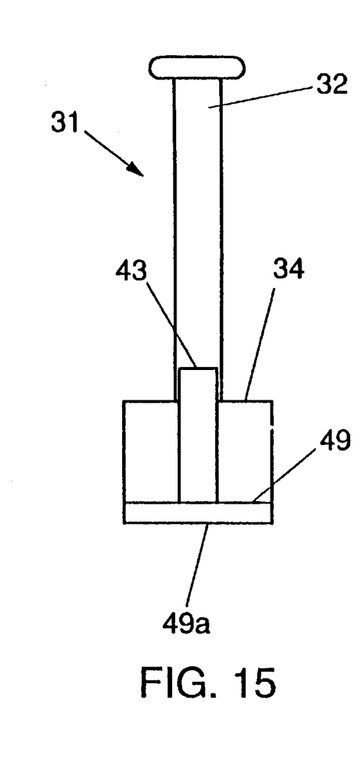
FIG. 15 is an elevation of a unit for use in the belt assembly according to FIG. 14, viewed in the direction of the path of the belt.

FIGS. 14 and 15 show a preferential exemplary embodiment of the invention.

This embodiment relates to a unit 31 having a carrier 32 and a body 34. With the unit 31, end parts 33a of belts 33 can be connected to each other, as appears from FIG. 14.

The unit 31 comprises channels 37 with open flanks having the end parts 33a of belts 33 clamped therein. The contours 40, against which rest the belt end parts 33a, are bent to such an extent as to have portions 40a directed in mutually opposite directions. The belt end parts 33a in the channels 37 are bent to a corresponding extent, so that the ends thereof also point in mutually opposite directions.

Owing to this structure, the unit 31 according to this exemplary embodiment projects only over a slight distance relative to the path determined by the belt parts 33.

The end parts 33a can simply be slipped sideways through the open flanks of the channels 37 into the unit 31 and be clamped, whereupon they are confined and restrained from displacement in longitudinal direction owing to the retention elements constructed as teeth 39. Being clamped in the channels 37, the belt parts 33a are restrained from lateral displacement. A central part 42, which is clamped tightly between teeth of the two belt end parts 33a, also contributes to the retention of the belt portions 33 in both lateral and longitudinal directions, an accurate positioning being obtained in particular in longitudinal direction. This last, in turn, is important to obtain a continuous row of teeth along the toothed surfaces 38 of the belt portions 33, the pitch between teeth of one belt portion 33 and the other belt portion 33 always being a whole multiple of the pitch between successive teeth of each belt portion.

In combination with the open flanks of the channels 37, the oppositely directed course of the end parts 33a of the belt parts 33 is moreover advantageous because at a given belt tension the bending moment exerted on the parts of the unit that determine the contours 40 is considerably smaller than in the case where the end parts extend perpendicularly to the path determined by the belt parts 33 and form arms extending transversely to the direction of tension.

The unit 31 according to FIGS. 14 and 15 can be simply manufactured by injection-moulding from plastics. In order to increase the resistance against deformation upon prolonged loading, the body 34 of the unit comprises a stiffening rib 43 extending about the channel 37.

The unit 31 further comprises a carrier in the form of a finger 32, integrally formed thereon. In order to prevent the unit 31 from tilting backwards when a force is exerted on the finger 32 and to prevent an increase of the tension in the belt, the unit 31 is provided on one side 28 with a supporting member 49 having a supporting surface 49a extending in the direction of path of the belt and against which the back side of the belt 33 abuts when the portions thereof that are adjacent to the unit 31 on either side thereof are tensioned in a straight path.

Backward tilting of the unit 31 is further prevented in that the finger 32 is not arranged centrally but at a greater distance from the supporting member 49. Also the relatively great length of the unit 31 in the direction of the path, obtained through the partly opposite direction of the channels 37, contributes to an effective support of the unit against backward tilt.

Instead of having a substantially oppositely directed configuration, the contours 40 and the end parts 33a of the belt parts 33 may also have configurations that diverge relatively to each other, away from the path determined by the belt portions. In that case, too, compared with an embodiment where the contours and the belt portions are directed perpendicularly to the path determined by the belt portions, a flatter construction of the unit and a reduction of the bending moments exerted on the parts of the unit that carry the contours 40. However, the effect achieved is then smaller than in the case of the embodiment of the invention shown in FIGS. 14 and 15.

It will be clear that the present invention is not limited to the embodiments described, but that various modifications are possible within the scope of the invention.

What is claimed is:

1. A belt assembly for mounting under tension on a belt path, comprising:

a toothed gear, a belt having a toothed surface for driving by the toothed gear and an oppositely located back surface, and at least one unit fastened to the belt on the side of the back surface, wherein, in the area of the at least one unit, parts of the belt are bent out of the path of the belt assembly in the direction of the unit, said unit including a contour against which the back surfaces of the bent belt parts abut and at least one retention element which is in engagement with the toothed surface of the bent belt parts, the retention element and the contour positioning the belt parts so that teeth of portions of the toothed belt on either side of the unit define a toothed profile extending over both belt portions and across the unit, a distance between teeth of one belt portion and teeth of the other belt portion across the unit being a whole multiple of a pitch of successive teeth of each belt portion.

2. A belt assembly according to claim 1, wherein the contour of parts of the unit against which the back surfaces of the bent belt parts abut are shaped so that the distance between teeth of one belt portion and teeth of the other belt portion is a whole multiple of the pitch of successive teeth of each belt portion when those belt portions extend along a path bent so that the toothed side of the belt is located on the inside.

3. A belt assembly according to claim 1, wherein the toothed belt is interrupted and belt end parts on either side of the interruption constitute the bent belt parts.

4. A belt assembly according to claim 3, wherein the belt end parts diverge relative to each other.

5. A belt assembly according to claim 3, wherein the belt end parts are bent in substantially opposite directions.

6. A belt assembly according to claim 3, wherein the unit includes channels for receiving belt end parts, which channels are provided with laterally open flanks, so that the bent belt end parts can be slipped into and out of the unit in both lateral directions.

7. A belt assembly according to claim 1, wherein the unit includes two channels extending from an underside of the unit facing the belt, and wherein retention elements project into the channels, and in which channels the bent belt parts are received so as to be form-closed in a longitudinal direction.

8. A belt assembly according to claim 7, the unit further comprising a central post disposed between the channels, an end of the post projecting beyond the underside of the unit, the end of the post being shaped as a tooth.

9. A belt assembly according to claim 1, wherein the unit comprises a block-shaped body having a passage of a substantially rectangular cross-section extending substantially perpendicularly from an underside of the unit facing the belt through the entire block-shaped body, first sides of said passage extending perpendicularly to the direction of the path of the belt and having a length substantially corresponding to a width of the belt, second sides of said passage have a length so to define a space between the first sides sufficient to accommodate two belt parts having their toothed surfaces disposed against each other or a doubled belt part, the unit further comprising means for fixing the belt parts having their toothed surfaces disposed against each other or doubled belt part in the rectangular passage using a fixing pin serving as said retention element, the fixing pin extending transversely to the direction of the path of the belt, parallel to a belt surface, and between the belt parts having their toothed surfaces facing each other or between legs of a loop formed by the doubled belt part.

10. A belt assembly according to claim 9, further comprising means including a fixing pin for fixing the belt parts having their toothed surfaces disposed against each other or the doubled belt part in the rectangular passage, said means further including two slots providing supporting surfaces for the fixing pin, said slots being provided in the respective passage walls corresponding with the second sides of the passage, said slots extending from an upper side of the block-shaped body, substantially parallel to the passage and terminating substantially halfway in the passage.

11. A belt assembly according to claim 1, wherein the unit comprises a carrier.

12. A belt assembly according to claim 11, wherein the carrier constitutes an integral part of the unit.

13. A belt assembly according to claim 11, wherein the unit is provided, at least on one side, with a supporting member comprising a supporting surface which extends in the direction of the path of the belt and against which abuts the back side of the belt when the portions of the belt adjacent to the unit on either side thereof are tensioned along a straight path.

14. A belt assembly according to claim 1, wherein the unit further comprises a magnetic detection element.

15. A belt assembly for mounting along a belt path in tensioned condition, comprising a belt having a toothed surface and an oppositely located back surface and at least one unit fastened to the belt in a position on the side of the back surface, wherein, in the area of said unit, portions of the belt are bent out of the path of the belt assembly in the direction of the unit, and said unit comprises at least one retention element in engagement with the toothed surfaces of the bent belt portions, said unit having supporting contours against which the back surfaces of the bent belt portions abut, and having a connecting portion carrying said supporting contours in substantially fixed positions relative to each other and defining at least one passage for receiving said bent belt portions, said at least one retention element projecting from said connecting portion into said passage in a substantially fixed position relative to said support contours.

16. A unit for connection to portions of an elongated toothed belt having a tensioned belt path, comprising:

oppositely arranged supporting contours for supporting portions of a toothed belt bent out of the belt path, at least one retention element located opposite at least one of said supporting contours and adapted for engagement with the toothed surfaces of the bent belt portions, and a connecting portion carrying said supporting contours in substantially fixed positions relative to each other and extending about at least one channel for receiving the bent belt portions, and said at least one retention element projecting from said connecting portion into said channel in a substantially fixed position relative to said support contours.

17. A belt assembly according to claim 15, wherein the connecting portion is integrally formed with the supporting contours.

18. A belt assembly according to claim 17, wherein the connecting portion is integrally formed with the retention element.

19. A belt assembly according to claim 18, wherein the connecting portion extends around the bent belt portions so as to form a channel for receiving the bent belt portions.

20. A belt assembly according to claim 19, wherein the channel is open on at least one side thereof for enabling the bent belt portions to be slipped into and out of the channel sideways.

21. A belt assembly according to claim 15, wherein the connecting portion is integrally formed with the retention element.

22. A unit according to claim 16, wherein the connecting portion is integrally formed with the supporting contours.

23. A unit according to claim 22, wherein the connecting portion is integrally formed with the retention element.

24. A unit according to claim 23, wherein the connecting portion extends around the bent belt portions so as to form a channel for receiving the bent belt portions.

25. A unit according to claim 24, wherein the channel is open on at least one side thereof for enabling the bent belt portions to be slipped into and out of the channel sideways.

26. A unit according to claim 16, wherein the connecting portion is integrally formed with the retention element.

\* \* \* \* \*